G. DELKER.

SPRING VEHICLE.

No. 10,236. Reissued Nov. 14, 1882.

Witnesses:
A. M. Long.
William S. Sayers.

Inventor
George Delker.
By Knight Bros
Atty's.

N. PETERS, Photo-Lithographer, Washington, D. C.

UNITED STATES PATENT OFFICE.

GEORGE DELKER, OF HENDERSON, KENTUCKY.

SPRING-VEHICLE.

SPECIFICATION forming part of Reissued Letters Patent No. 10,236, dated November 14, 1882.

Original No. 249,316, dated November 8, 1881. Application for reissue filed June 24, 1882.

*To all whom it may concern:*

Be it known that I, GEORGE DELKER, a citizen of the United States, residing at Henderson, in the county of Henderson and State of Kentucky, have invented certain new and useful Improvements in Spring-Vehicles, of which the following is a specification.

My invention relates to a mode of combining a phaeton-body, or one curved upward or elevated at back and generally at front also, with the modern side-bar gearings and springs. To this end I support the front of the body from the side bars through suitable springs, and a transverse bar, preferably of hard wood, framed into the body or attached thereto at a little distance from the front, and I support the upwardly curved or projecting back by inclined brackets of metal, which may be curved or straight, according to the style of the work.

The phaeton styles have heretofore been made in combination with elliptic springs. This necessitated the use of much lower front wheels than hind wheels or else the downward bending or cranking of the front axle, which is distasteful in appearance.

Phaeton-shaped bodies have also been combined with side springs by fastening the body to the said side springs near the center through the medium of short braces or hangers; but such side-spring gearings having no rigid connections between the axles to hold the wheels square, a serious disadvantage results in the liability of the wheels to be strained out of square or parallelism when the vehicle is loaded more heavily on one side than the other.

By my invention I produce a novel, attractive, and serviceable vehicle at less cost in construction. I also secure the advantage of high front wheels without cranking the front axle, and produce at the same time a vehicle hung low and easy to mount, and having a gearing rigid enough to maintain the parallelism of its wheels and prevent unequal loading from affecting the square symmetry of the running-gear.

My improvements possess the further advantage of adapting other than straight-bottomed bodies to the system of side-bar gearings and various styles of springs, and of producing vehicles with phaeton-shaped bodies adapted for four passengers as well as for two.

In order that my invention may be fully understood, I will proceed to describe it with reference to the accompanying drawings, in which—

Figure 1:
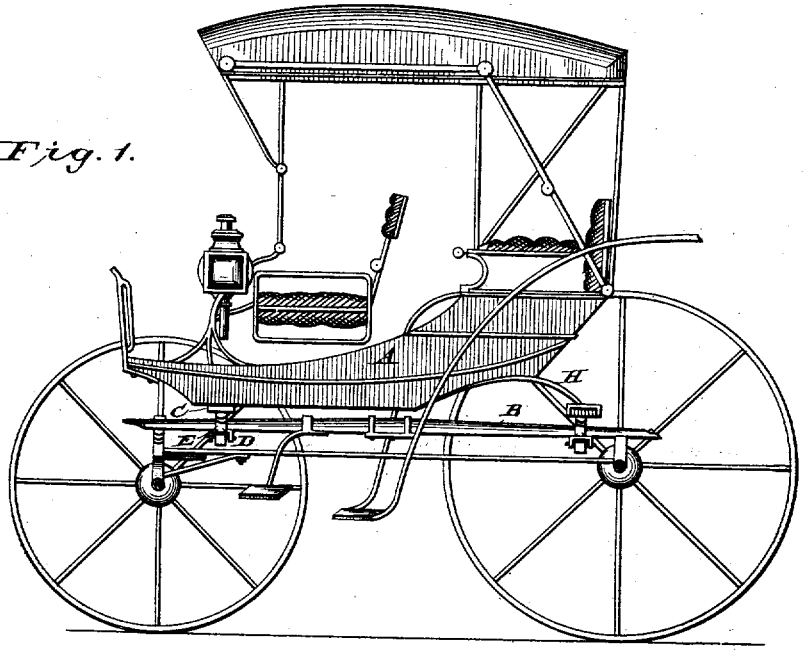
Figure 2:
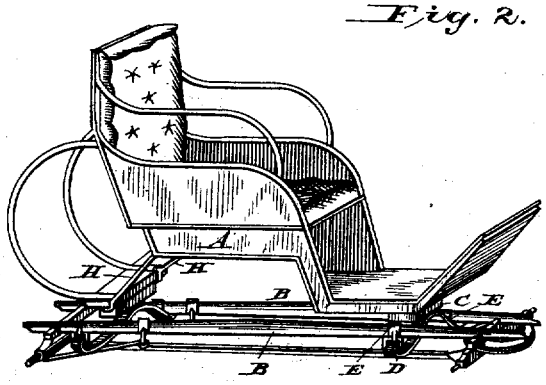

Figure 1 is a side view of a four-passenger phaeton, illustrating the invention. Fig. 2 shows the application of the invention to an angular-shaped body.

A represents a phaeton-body, which may be of any preferred style, having its ends higher than its middle portion. Attached to its rear part are rigid iron brackets or supports H, by which it is connected and secured to the side-bar gearing in connection with any suitable system of springs.

C represents a spring-bar or spring-support, of hard wood, made in the body or attached thereto, as preferred, and employed to support the front of the body on the front springs, D D, which springs may be placed transversely, longitudinally, or obliquely, as preferred, without departing from the essential features or principles of my invention. I have shown for the purpose of illustration the extremities of the springs secured to the side bars, B, by clips E.

By means of the transverse bar C, I am enabled to support phaeton-shaped bodies on side-bar gearings and side-bar systems of springs, some of which excel the elliptic springs in ease, and I am also enabled to combine the phaeton-body, rigid side-bar gearing, and high front wheels without downwardly-cranked front axles.

Having thus described my invention, the following is what I claim as new therein and desire to secure by Letters Patent:

In combination with side bars rigidly connected with a front head-block and rear axle and suitable front and rear springs, a phaeton-shaped body having at its rear or raised portion downwardly-projecting rigid brackets H, extending to the rear springs and secured thereto, and provided near its front with bar or support C, secured to the front springs, substantially as and for the purpose set forth.

GEORGE DELKER.

Witnesses:
C. W. RANKIN,
E. H. BRANSON.